3,578,723
ISOMERIZATION AND DISPROPORTIONATION
OF AROMATIC HYDROCARBONS
Emmerson Bowes, Media, and John J. Wise, Philadelphia,
Pa., assignors to Mobil Oil Corporation
No Drawing. Filed Apr. 18, 1968, Ser. No. 722,162
Int. Cl. C01b 33/28; C07c 3/58, 5/22
U.S. Cl. 260—672
12 Claims

ABSTRACT OF THE DISCLOSURE

A new and unusual family of crystalline zeolites identified as zeolite ZSM–4 are used as catalysts for the isomerization and disproportionation of aromatic hydrocarbons.

BACKGROUND OF THE INVENTION

Field of the invention

The present invention relates to the use of novel crystalline zeolites identified as ZSM–4 for the isomerization and disproportionation of aromatic hydrocarbons. Typical examples are the isomerization of alkyl benzenes such as the isomeric xylenes to produce paraxylene, and the disproportionation of alkyl benzenes such as toluene to produce benzene and polymethyl benzenes.

DESCRIPTION OF THE PRIOR ART

The catalytic intra and/or inter rearrangement of alkyl groups present in alkyl aromatic hydrocarbons to provide one or more products suitable for use in the petroleum and chemical industries has heretofore been effected by a wide variety of catalysts. Acidic halides such as aluminum chloride, aluminum bromide, boron trifluoride-hydrogen fluoride mixtures, etc. have been used in the rearrangement of alkyl benzenes to provide valuable intermediates which find utility in the synthesis of rubber, plastic, fibers and dyes. Other catalysts which have been used include solid siliceous cracking-type catalysts such as silica-alumina and clays. Although various catalysts possess one or more desired characteristics, a majority of the catalysts heretofore employed suffer from several disadvantages. Acidic halides such as aluminum chloride, for example, are partially soluble in the feed material and are easily lost from the catalyst zone. Catalysts of this type are also uneconomical because of their extreme corrosiveness and requirement for recovery from the effluent products. Other catalysts of the heterogeneous type, such as silica-alumina, do not possess sufficient acidity to provide effective conversion and necessitate the use of relatively high temperatures above the order of 800° F. High temperatures frequently lead to coke formation which lowers the yield of desired product and necessitates frequent regeneration of the catalyst to remove coke. This results in reducing on-stream time and leads to high catalyst consumption due to loss of catalyst activity. Heterogeneous catalysts such as the crystalline aluminosilicates, both natural and synthetic, possess sufficient acidity but suffer the disadvantage of poor selectivity and ageing as evidenced by "coke" make and the excessive amounts of disproportionated products formed in isomerization reactions and cracked products in disproportionation processes.

SUMMARY

The invention relates to the use of a novel and unusual class of crystalline zeolites identified as ZSM–4 as catalysts for the isomerization and disproportionation of alkyl aromatic hydrocarbons. In accordance with the invention, ZSM–4 catalyst has been found to provide exceptionally high selectivity in the isomerization of aromatics such as xylene or the disproportionation of alkyl benzenes such as toluene. Such selectivity, defined hereinafter, distinguishes ZSM–4 from other known crystalline zeolite catalysts inasmuch as the ZSM–4 family of catalysts are uniquely characterized by selectivities in excess of 4 and generally in excess of 6. In one aspect of the invention, ZSM–4 is ideally suited for carrying out isomerization and disproportionation of alkyl aromatic hydrocarbons in a low temperature, liquid phase operation.

PREFERRED EMBODIMENT

The novel crystalline zeolites used for purposes of the invention are designated as "Zeolite ZSM–4" or simply "ZSM–4." ZSM–4 compositions can be identified in terms of mole ratios of oxides as follows:

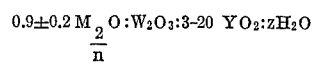

wherein M is a cation, $n$ is the valence of said cation, W is selected from the group consisting of aluminum and gallium, Y is selected from the group consisting of silicon and germanium, and $z$ is from 0 to 20. In the as synthesized form the zeolite has a formula, in terms of mole ratios of oxides as follows:

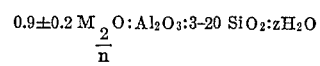

and M is selected from the group consisting of a mixture of tetramethylammonium cations and alkali metal cations, especially sodium. The original cations can be present so that the amount of tetramethylammonium cations is between 1 and 50 percent of the total amount of the original cations. Thus, the zeolite can be expressed by the following formula, in terms of mole ratios of oxides:

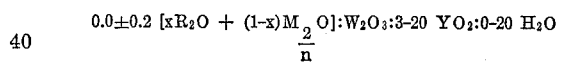

where W and Y have the previously assigned significance, R is tetramethylammonium, M is an alkali metal cation and $x$ is between 0.01 and 0.50.

The original cations can be replaced, at least in part, by ion exchange with another cation. Preferably, the other cation is selected from the group consisting of alkylammonium, e.g. tetramethylammonium, arylammonium, metals, ammonium, hydrogen, thermally treated products of ammonium and/or hydrogen, or combinations of any of these cations. Particularly, preferred cations include hydrogen, rare earth metals, aluminum, metals of groups II and VIII of the Periodic Table and manganese. Also desired are zeolites which are thermally treated products of the ammonium, hydrogen, arylammonium and/or alkylammonium cationic forms, said thermal treatment consisting of heating the zeolite in the particular cation form at a temperature of at least about 700° F. In a preferred embodiment of ZSM–4, W is aluminum, Y is silicon and the silica/alumina mole ratio is at least 5 and ranges up to about 15.

Members of the family of ZSM–4 zeolites possess a definite distinguishing crystalline structure whose X-ray diffraction pattern has the following values:

TABLE 1

| Interplanar spacing d(A.): | Relative intensity |
|---|---|
| 9.1 ±.2 | vs |
| 7.94±.1 | mw |
| 6.90±.1 | m |
| 5.97±.07 | s |

TABLE 1—Continued

| Interplanar spacing d(A.): | Relative humidity |
|---|---|
| 5.50±.05 | mw |
| 5.27±.05 | mw |
| 4.71±.05 | mw |
| 4.39±.05 | w |
| 3.96±.05 | w |
| 3.80±.05 | s |
| 3.71±.05 | m |
| 3.63±.05 | m |
| 3.52±.05 | s |
| 3.44±.05 | m |
| 3.16±.05 | s |
| 3.09±.05 | m |
| 3.04±.05 | m |
| 2.98±.05 | m |
| 2.92±.05 | s |

These values were determined by standard techniques. The radiation was the K-alpha doublet of copper, and a Geiger counter spectrometer with a strip chart pen recorder was used. The peak heights, I, and the positions as a function of 2 times theta, where theta is the Bragg angle, were read from the spectrometer chart. From these, the relative intensities, 100 I/I$_0$, where I$_0$ is the intensity of the strongest line or peak, and d (obs.), the interplanar spacing in A., corresponding to the recorded lines, were calculated. In Table 1 the relative intensities are given in terms of the symbols s=strong, m=medium, ms=medium strong, mw=medium weak and vs=very strong. It should be understood that this X-ray diffraction pattern is characteristic of all of the species of ZSM-4 compositions. Ion exchange of the sodium ion with another cation reveals substantially the same pattern with some minor shifts in interplanar spacing and variation in relative intensity. Various cation exchanged forms of ZSM-4 have been prepared. X-ray powder diffraction patterns of several of these forms are set forth below. The ZSM-4 forms set forth below are all aluminosilicates.

Zeolite ZSM-4 can be suitably prepared by preparing a solution containing R$_2$O, sodium oxide, an oxide of aluminum or gallium, an oxide of silica or germanium, and water and having a composition, in terms of mole ratios of oxides, falling within the following ranges:

TABLE 2

| | Broad | Preferred |
|---|---|---|
| $\dfrac{Na_2O}{R_2O+Na_2O}$ | .31 to 1 | .75 to .99 |
| $\dfrac{R_2O+Na_2O}{YO_2}$ | .05 to .90 | .15 to .75 |
| $\dfrac{YO_2}{W_2O_3}$ | 3 to 60 | 6 to 30 |
| $\dfrac{H_2O}{R_2O+Na_2O}$ | 15 to 600 | 20 to 150 | wherein R is a tetramethylammonium cation, W is aluminum or gallium and Y is silicon or germanium, and maintaining the mixture until crystals of the zeolite are formed. Thereafter, the crystals are separated from the liquid and recovered. ZSM-4 is preferably formed as an aluminosilicate. The composition can be prepared utilizing materials which supply the appropriate oxide. Such compositions include for an aluminosilicate, sodium aluminate sodium silicate, silica hydrosol, silica gel, silicic acid, sodium hydroxide and tetramethylammonium hydroxide. It will be understood that each oxide component utilized in the reaction mixture for preparing a member of the ZSM-4 family can be supplied by one or more initial reactants. For example, sodium oxide can be supplied by an aqueous solution of sodium hydroxide, or by an aqueous solution of sodium silicate. The reaction mixture can be prepared either batchwise or continuously. Crystal size and crystallization time of the ZSM-4 composition will vary with the nature of the reaction mixture employed.

| NaTMAZSM-4 | | NaTMAZSM-4 | | HZSM-4 | | ZnNaTMAZSM-4 | | RENaZSM-4 | | CaNaTMAZSM-4 | | MgNaTMAZSM-4 | |
|---|---|---|---|---|---|---|---|---|---|---|---|---|---|
| d (A.) | I/I$_0$ | d (A.) | I/I$_0$ | d (A.) | I/I$_0$ | d (A.) | I/I$_0$ | d (A.) | I/I$_0$ | d (A.) | I/I$_0$ | d (A.) | I/I$_0$ |
| 17.5 | 2 | 17.6 | 5 | | | | | | | 17.5 | 8 | | |
| 16.0 | 17 | 16.1 | 20 | 15.8 | 12 | 16.1 | 6 | | | 15.8 | 38 | 16.1 | 17 |
| 9.18 | 100 | 9.19 | 100 | 9.12 | 100 | 9.21 | 79 | 9.12 | 87 | 9.10 | 100 | 9.07 | 100 |
| 7.96 | 21 | 7.96 | 20 | 7.88 | 49 | 7.97 | 40 | 7.93 | 8 | 7.90 | 11 | 7.93 | 28 |
| | | 7.34 | 3 | | | | | 6.89 | 42 | 6.88 | 43 | 6.89 | 36 |
| 6.94 | 12 | 6.93 | 30 | 6.85 | 24 | 6.92 | 36 | 5.97 | 71 | 5.96 | 55 | 5.98 | 64 |
| 6.01 | 34 | 6.01 | 33 | 5.95 | 62 | 6.01 | 60 | 5.49 | 5 | 5.49 | 13 | 5.50 | 7 |
| 5.53 | 4 | 5.53 | 7 | 5.47 | 10 | 5.53 | 6 | 5.27 | 10 | 5.26 | 10 | 5.29 | 17 |
| 5.29 | 8 | 5.29 | 7 | 5.25 | 10 | 5.29 | 15 | 4.79 | 8 | 4.92 | 3 | | |
| 4.73 | 30 | 4.72 | 31 | 4.69 | 19 | 4.73 | 51 | 4.70 | 37 | 4.70 | 18 | 4.73 | 48 |
| | | | | 4.54 | 7 | | | | | 4.61 | 5 | | |
| 4.41 | 4 | 4.39 | 4 | 4.37 | 23 | 4.40 | 9 | 4.38 | 16 | 4.37 | 15 | 4.41 | 10 |
| 4.12 | 5 | 4.19 | 1 | | | | | | | 4.11 | 5 | | |
| 3.97 | 13 | 3.95 | 11 | 3.94 | 20 | 3.97 | 18 | 3.94 | 10 | 3.95 | 13 | 3.96 | 12 |
| 3.82 | 67 | 3.81 | 69 | 3.78 | 52 | 3.82 | 100 | 3.79 | 100 | 3.80 | 63 | 3.81 | 95 |
| 3.74 | 11 | 3.72 | 28 | 3.69 | 14 | 3.72 | 36 | 3.71 | 32 | 3.71 | 18 | 3.72 | 36 |
| 3.64 | 31 | 3.63 | 26 | 3.61 | 13 | 3.64 | 24 | 3.62 | 24 | 3.62 | 25 | 3.64 | 26 |
| 3.54 | 30 | 3.53 | 54 | 3.50 | 28 | 3.53 | 72 | 3.52 | 82 | 3.52 | 55 | 3.53 | 86 |
| 3.46 | 7 | 3.45 | 14 | 3.42 | 12 | 3.45 | 15 | 3.44 | 20 | 3.44 | 15 | 3.45 | 24 |
| 3.28 | 4 | 3.28 | 5 | | | | | | | | | 3.28 | 5 |
| 3.17 | 73 | 3.16 | 48 | 3.15 | 43 | 3.17 | 60 | 3.15 | 58 | 3.15 | 55 | 3.16 | 67 |
| 3.10 | 12 | 3.10 | 23 | 3.07 | 14 | 3.10 | 27 | 3.08 | 26 | 3.09 | 25 | 3.10 | 33 |
| 3.05 | 25 | 3.04 | 21 | 3.03 | 20 | 3.05 | 27 | 3.03 | 24 | 3.04 | 20 | 3.05 | 28 |
| 2.99 | 14 | 2.99 | 13 | 2.97 | 10 | 3.00 | 18 | 2.98 | 24 | 2.98 | 23 | 3.00 | 21 |
| 2.93 | 43 | 2.92 | 28 | 2.91 | 29 | | | 2.92 | 66 | 2.92 | 63 | 2.92 | 74 |
| 2.83 | 4 | 2.83 | | 2.81 | 1 | | | 2.83 | 4 | 2.83 | 4 | 2.84 | 3 |
| 2.775 | 1 | | | 2.77 | 1 | | | 2.65 | 7 | 2.65 | 14 | 2.66 | 10 |
| 2.67 | 3 | 2.67 | 2 | | | 2.66 | 9 | 2.63 | 10 | 2.625 | 9 | 2.63 | 9 |
| 2.65 | 6 | 2.65 | 3 | 2.64 | 7 | 2.64 | 8 | | | 2.55 | 2 | 2.56 | 3 |
| 2.63 | 5 | 2.63 | 3 | 2.61 | 3 | 2.57 | 2 | 2.53 | 11 | 2.52 | 8 | 2.53 | 9 |
| 2.56 | 1 | 2.55 | 2 | 2.55 | 1 | 2.53 | 8 | 2.49 | 4 | 2.48 | 3 | 2.49 | 4 |
| 2.52 | 6 | 2.52 | 3 | 2.52 | 5 | 2.51 | 2 | 2.43 | 2 | 2.43 | 2 | 2.43 | 3 |
| 2.49 | 4 | 2.48 | 2 | 2.49 | 2 | 2.48 | 1 | | | 2.40 | 2 | 2.40 | 4 |
| 2.43 | 1 | 2.41 | 1 | 2.42 | 1 | 2.42 | 2 | 2.38 | 10 | 2.375 | 6 | 2.38 | 7 |
| 2.40 | 3 | 2.395 | 2 | 2.39 | 1 | 2.39 | 6 | 2.27 | 10 | 2.275 | 10 | 2.29 | 7 |
| 2.38 | 5 | 2.37 | 2 | 2.36 | 2 | 2.35 | 1 | | | | | 2.27 | 3 |
| 2.34 | 1 | 2.30 | 1 | | | 2.29 | 4 | 2.20 | 3 | 2.20 | 1 | 2.205 | 4 |
| 2.28 | 7 | 2.27 | 2 | 2.27 | 3 | 2.265 | 2 | | | 2.16 | 2 | 2.17 | 5 |
| 2.19 | 2 | | | 2.18 | 2 | 2.17 | 4 | | | 2.14 | 2 | 2.14 | 7 |
| 2.17 | 1 | | | 2.15 | 2 | 2.145 | 3 | 2.10 | 4 | 2.10 | 3 | 2.11 | 5 |
| 2.14 | 3 | 2.14 | 2 | 2.125 | 3 | 2.115 | 3 | | | 2.08 | 1 | 2.09 | 3 |
| 2.10 | 4 | 2.10 | 2 | 2.10 | 3 | 2.10 | 2 | | | 2.03 | 1 | 2.04 | 5 |
| 2.09 | 2 | 2.08 | 1 | 2.07 | 1 | 2.06 | 3 | | | 2.015 | 2 | 2.02 | 1 |
| 2.04 | 1 | 2.03 | 1 | 2.02 | 2 | 2.015 | 1 | 1.98 | 6 | 1.985 | 6 | 1.99 | 9 |
| 2.02 | 3 | 2.015 | 1 | 2.01 | 2 | 2.00 | 6 | | | | | | |
| 1.99 | 6 | 1.98 | 4 | 1.98 | 3 | 1.97 | 6 | | | | | | |

One method of preparing this new zeolitic material comprises forming an aqueous solution of the reactant mixture which solution is designated for convenience as a crystallization directing agent, or CDA, which contains sodium oxide, alumina, silica, and water. Use of this crystallization directing agent has been found to lead to better yields of ZSM-4 crystals and greater reproducibility. The CDA mixture or agent can have a composition, in terms of mole ratios of oxides, within the following ranges:

TABLE 3

| | Broad | Preferred | Most preferred |
|---|---|---|---|
| $\frac{Na_2O}{SiO_2}$ | 1 to 4 | 1.5 to 3 | 1.85 |
| $\frac{SiO_2}{Al_2O_3}$ | 2 to 40 | 7 to 20 | 16 |
| $\frac{H_2O}{Na_2O}$ | 10 to 60 | 15 to 25 | 18 |

The crystallization directing agent mixture, is aged for a period of time of about 0.2 to 4 hours, preferably 0.5 to 2 hours, at 40 to 70° C., preferably 60° C., and mixed into a second solution containing sodium oxide, silica, and water. A third solution containing alumina and water is added to the resultant solution with stirring thereby forming a slurry. The amounts of sodium oxide, silica, alumina and water in these later solutions are such that when added to the CDA, the amounts of the various ingredients fall within the broad range of Table 2. The slurry is heated for a short period of time at about 100° C., say, between about 0.5 and 1 hour, and the resultant product is filtered. The resulting filter cake comprises an amorphous material which is mixed in its wet state with solution, e.g. an aqueous solution, of tetramethylammonium hydroxide, preferably, a somewhat dilute solution of about 5 to 25% concentration, weight basis. After thorough mixing, the last-described mixture, which is in the form of a slurry, is heated over a period of time to produce a crystalline product. It is generally heated at a temperature of about 100° C. for between about 1 and 3 days. The product is then filtered, washed until the washings show a pH below 11, and dried at 100-110° C., for several hours.

When preparing the ZSM-4 catalyst, it is preferred to mix the various solutions employed in a mixing nozzle so as to effect maximum contact of the respective ingredients together. This contact in a mixing nozzle precedes heating of any resultant solution and crystallization of the aluminosilicate. This method is preferred whether or not a CDA is utilized and whether or not the tetramethylammonium compound is introduced directly into the solution or passed over the wet filter cake as discussed above. Less tetramethylammonium oxide is required to prepare ZSM-4 crystals by first preparing a wet filter cake than by the solution method normally utilized, provided sodium hydroxide is included in the tetramethylammonium ion solution to balance the electronegative charge of the aluminosilicate tetrahedra. However, as the ratio of tetramethylammonium ions to sodium ions in the solution passed over the filter cake increases, the time of crystallization increases. Thus, if the time for crystallization of the ZSM-4 crystals is not critical, one can prepare ZSM-4 crystals employing a fraction of the amount of tetramethylammonium oxide employed in the solution method and compensating the electronegative charge of the aluminosilicate tetrahedra by increasing the sodium ion content in the solution passed over the wet filter cake proportionately.

Members of the ZSM-4 family, can be base exchanged to remove the sodium cations by such ions as hydrogen (from acids), ammonium, and alkylammonium and arylammonium including $RNH_3$, $R_3NH+$, $R_2NH_2+$ and $R_4N+$ where R is alkyl or aryl, provided that steric hindrance does not prevent the cations from entering the cage and cavity structure of the ZSM-4 aluminosilicate composition. The hydrogen form of ZSM-4, useful in such hydrocarbon conversion processes as isomerization of poly-substituted alkyl aromatics and disproportionation of alkyl aromatics, is prepared, for example, by base exchanging the sodium form with, say, ammonium chloride or hydroxide whereby the ammonium ion is substituted for the sodium ion. The composition is then calcined at a temperature of, say, 1000° F. causing evolution of ammonia and retention of a proton in the composition. Other replacing cations include cations of the metals of the Periodic Table, especially metals other than sodium, especially metals of Group II, e.g. zinc and Group VIII of the Periodic Table and rare earth metals and manganese.

The above crystalline zeolite especially in its metal, hydrogen, ammounium, alkylammonium and arylammonium forms can be beneficially converted to another form by thermal treatment. This thermal treatment is generally performed by heating one of these forms at a temperature of at least 700° F. for at least 1 minute and generally not greater than 20 hours. While subatmospheric pressure can be employed for the thermal treatment, atmospheric pressure is desired for reasons of convenience. It is preferred to perform the thermal treatment in the presence of moisture although moisture is not absolutely necessary. The thermal treatment can be performed at a temperature up to about 1600° F. at which temperature some decomposition begins to occur. The thermally treated product is particularly useful in the catalysis of certain hydrocarbon conversion reactions.

Regardless of the cations replacing the sodium in the synthesized form of the ZSM-4, the spatial arrangement of the aluminum, silicon and oxygen atoms which form the basic crystal lattice of ZSM-4, remains essentially unchanged by the described replacement of sodium or other alkali metal as determined by taking an X-ray powder diffraction pattern of the ion-exchanged material. Such X-ray diffraction pattern of the ion-exchanged ZSM-4 reveals a pattern substantialy the same as that set forth in Table 1 above.

Ion exchange of the zeolite can be accomplished conventionally, as by packing the zeolite in the form of beds in a series of vertical columns and successively passing through the beds a water solution of a soluble salt of the cation to be introduced into the zeolite; and then to change the flow from the first bed to a succeeding one as the zeolite in the first bed becomes ion exchanged to the desired extent. Aqueous solutions of mixtures of materials to replace the sodium can be employed. For instance, if desired, one can exchange the sodium with a solution containing a number of rare earth metals suitably in the chloride form. Thus, a rare earth chloride solution commercially available can be used to replace substantially all of the sodium in a synthesized ZSM-4. This commercially available rare earth chloride solution contains chlorides of rare earth mixture having the relative composition: cerium (as $CeO_2$) 48% by weight, lanthanum (as $La_2O_3$) 24% by weight, praseodymium (as $Pr_6O_{11}$) 5% by weight, neodymium (as $Nd_2O_3$) 17% by weight, samarium (as $Sm_2O_3$) 3% by weight, gadolinium (as $Gd_2O_3$) 2% by weight, and other rare earth oxides 0.8% by weight. Didymium chloride is also a mixture of rare earth chlorides, but having a lower cerium content. It consists of the following rare earths determined as oxides: lanthanum 45-65% by weight, cerium 1-2% by weight, praseodymium 9-10% weight, neodymium 32-33% by weight, samarium 5-7% by weight, gadolinium 3-4% by weight, yttrium 0.4% by weight, and other rare earths 1-2% by weight. It is to be understood that other mixtures of rare earths are also applicable for the preparation of the novel compositions of this invention, although lanthanum, neodymium, praseodymium, samarium and gadolinium as well as mixtures of rare earth cations containing a predominant amount of one or more of the above cations are preferred.

Base exchange with various metallic and non-metallic cations can be carried out according to the procedure described in U.S. 3,140,251, 3,140,252 and 3,140,253.

The ZSM-4 zeolites are formed in a wide variety of particular sizes. Generally speaking, the particles can be in the form of a powder, a granule, or a molded product, such as extrudate having particle size sufficient to pass through a 2 mesh (Tyler) screen and be retained on a 400 mesh (Tyler) screen. In cases where the catalyst is molded, such as by extrusion, the zeolite can be extruded before drying or dried or partially dried and then extruded.

In the case of many catalysts, it is desired to incorporate the ZSM-4 with another material resistant to the temperatures and other conditions employed in organic conversion processes. Such materials include active and inactive materials and synthetic or naturally occurring zeolites as well as inorganic materials such as clays, silica and/or metal oxides. The latter may be either naturally occurring or in the form of gelatinous precipitates or gels including mixtures of silica and metal oxides. Use of a material in conjunction with the ZSM-4, i.e. combined therewith which is active, tends to improve the conversion and/or selectivity of the catalyst in certain organic conversion processes. Inactive materials suitably serve as diluents to control the amount of conversion in a given process so that products can be obtained economically and orderly without employing other means for controlling the rate of reaction. Normally, zeolite materials have been incorporated into naturally occurring clays, e.g. bentonite and kaolin, to improve the crush strength of the catalyst under commerical operating conditions. These materials, i.e. clays, oxides, etc., function as binders for the catalyst. It is desirable to provide a catalyst having good crush strength, because in a petroleum refinery the catalyst is often subjected to rough handling, which tends to break the catalyst down into powder-like materials which cause problems in processing. These clay binders have been employed normally only for the purpose of improving the crush strength of the catalyst.

Naturally occurring clays which can be composited with the ZSM-4 catalyst include the montmorillonite and kaolin family, which families include the sub-bentonites, and the kaolins commonly known as Dixie, McNamee, Georgia and Florida clays or others in which the main mineral constituent is halloysite, kaolinite, dickite, nacrite, or anauxite. Such clays can be used in the raw state as originally mined or initially subjected to calcination, acid treatment or chemical modification. One way to render the clays suitable for use is to treat them with sodium or potassium hydroxide, and calcine at temperatures ranging from 230° F. to 1600° F. thereby preparing a porous crystalline zeolite. Binders useful for compositing with the ZSM-4 catalyst also include inorganic oxides, notably alumina.

In addition to the foregoing materials, the ZSM-4 catalyst can be composited with a porous matrix material such as silica-alumina, silica-magnesia, silica-zirconia, silica-thoria, silica-beryllia, silica-titania as well as ternary compositions such as silica-alumina-thoria, silica-alumina-zirconia, silica-alumina-magnesia and silica-magnesia-zirconia. The matrix can be in the form of a cogel. The relative proportions of finely divided crystalline zeolite ZSM-4 and inorganic oxide gel matrix vary widely with the zeolite content ranging from about 1 to about 90 percent by weight and more usually, particularly when the composite is prepared in the form of beads, in the range of about 2 to about 50 percent by weight of the composite.

Catalytically active members of the family of zeolites designated as ZSM-4 possess a property of selectivity which distinguishes them from all known zeolites. Selectivity is measured as the ratio of o-xylene isomerized to that disproportionated. Selectivity designates the weight ratio of o-xylene isomerized to o-xylene disproportionated employing 200 ml. of o-xylene which has been percolated with activated alumina at 2 volumes per volume per hour at room temperature and introduced into a 1 liter steel shaker bomb containing 3.0 grams of zeolite which has been calcined, weighed out and after being weighed, dried at 900° F. for ½ hour, said bomb having been purged with nitrogen. The bomb is heated to 400° F. rapidly using an induction furnace while shaking at 200 r.p.m. using an electric driven single cylinder Lawson engine for shaking the bomb. The o-xylene is converted to conversion products, the bomb is water quenched, the shaking discontinued and the liquid sample analyzed. A complete description of apparatus to be used in determining the selectivity is disclosed in an article entitled "A New Laboratory Tool for Studying Thermal Processes" by J. W. Payne, C. W. Streed and E. R. Kent appearing in Industrial and Engineering Chemistry, volume 50, pp. 47–52 (1958). Such "selectivity" distinguishes ZSM-4 from other crystalline zeolites inasmuch as members of the ZSM-4 family are uniquely characterized by a greater selectivity than other known zeolite catalysts.

In the reaction of ortho xylene over an acidic catalyst there are two major competing hydrocarbon conversion reactions taking place, i.e. isomerization and disproportionation. The isomerization tends first to form meta xylene, and thence to proceed to para xylene. On the other hand, the disproportionation reaction tends to form a mixture of methyl benzenes, primarily toluene and trimethyl benzenes. Thus, a suitable isomerization catalyst should be one which provides the desired xylene isomers in good quantities relative to the amounts of disproportionated products obtained. The HZSM-4 catalyst has been found to provide a ratio of isomerization products to disproportionation products of at least 4 while other zeolite catalysts under the same reaction conditions were unable to achieve such high ratio. These include rare earth exchanged Linde Zeolite Y catalyst, rare earth exchanged Linde Zeolite X catalyst, HY, rare earth HY and hydrogen mordenite. As an example, the hydrogen form ZSM-4 is between 5 and 10 times more selective than a rare earth exchanged Linde Zeolite X aluminasilicate for ortho xylene isomerization. Additionally, this isomerization can be performed without impregnation into or onto the catalyst of a noble metal, such as platinum, and without employing hydrogen to assist in the isomerization. The fact that hydrogen can be dispensed with when employing the HZSM-4 catalyst for aromatic isomerization is particularly significant since the presence of hydrogen in an aromatic isomerization system, in addition to being expensive, tends to cause some saturation of the aromatic ring which results in subsequent cracking to undesired by-products. The HZSM-4 catalyst provides high selectivity at various silica-alumina mole ratios such as 5.8/1; 7/1 and 13/1.

The unusual selectivity is not unique to this isomerization test but is intrinsic. For example, the HZSM-4 catalyst is useful under certain more severe processing conditions for disproportionation of toluene, the process provides benzene, xylenes and other methylbenzenes. Cracking of the aromatics to lighter boiling non-aromatic products is a competing side reaction. The HZSM-4 catalyst has been found to provide a high selectivity in terms of the ratio of disproportionation products to cracked products obtained. Ratios obtained are about 100 to 1,000 whereas other zeolite catalysts such as rare earth exchanged faujasite, hydrogen faujasite, hydrogen mordenite, etc., give ratios of about 6 to 25. The selectivity as illustrated by the o-xylene test results characterizes the uniqueness of this catalyst as compared to all other known zeolite catalysts. Thus, the selectivity of the HZSM-4 catalyst is superior to all known zeolite catalysts in both isomerization and disproportionation processes.

The isomerization and disproportionation of aromatic hydrocarbons with ZSM-4 catalyst may be carried out at temperature between 250° F. and 1000° F. and at pressures ranging from ambient pressures or less up to about 2000 p.s.i.g. In general, the isomerization reaction will be carried out at temperatures ranging from 350° F. to 650° F. whereas the disproportionation reaction will be at higher temperatures within the range of 500 to 800° F. Within these limits the conditions of temperature and pressure will vary considerably depending upon equilibrium considerations and type of feed material. Optimum conditions are those in which maximum yields of desired isomer or disproportionated product are obtained and hence considerations of temperature and pressure will vary within a range of conversion levels designed to provide the highest selectivity and maximum yield.

Due to the unusual selectivity and activity of ZSM–4 catalyst, it has been found that controlled isomerization and disproportionation reactions can be achieved at temperatures below about 600° F. in a liquid phase operation using sufficient pressure to maintain the charge material in liquid phase. The liquid phase operation is especially advantageous since high levels of activity and selectivity can be maintained for extended periods of time.

The isomerization and disproportionation reactions can be carried out over a wide range of liquid hourly space velocities (LHSV) within the range of 0.05 to 40. In the preferred operation the space velocity will be within the range of 0.25 to 10 since the conversion generally decreases with an increase in space velocity although selectivity is usually increased.

A variety of aromatic hydrocarbons may be used for carrying out the isomerization and disproportionation process of the invention depending upon the product desired and the chemical reactions involved. Alkyl benzenes which contain between 1 and 4 carbon atoms in the alkyl side chain(s) may be isomerized by shifting the alkyl substituent to different positions on the benzene nucleus. Similarly, alkyl aromatics such as toluene or ethylbenzene can be disproportionated to benzene and polymethylbenzenes, and benzene and polyethylbenzenes, respectively. The process of the invention is particularly useful for converting mono- and polyalkylbenzenes by isomerization or disproportionation into polyalkylbenzenes which contain a substantial amount of valuable benzenes substituted in the 1, 3 or 1, 3, 5 position with low molecular weight alkyl substituents.

Further examples of suitable feed stocks for the process of the invention include monoalkyl and polyalkyl substituted aromatic hydrocarbons such as o-xylene, m-xylene, p-xylene, trimethyl-, tetramethyl-, pentamethyl- and hexamethylbenzenes, polyethylbenzenes, ethyltoluenes, ethylxylenes, polypropyl and polybutylbenzenes, as well as analogous polynuclear derivatives such as the naphthalenes and anthracenes. It is not essential that the aromatic compounds be employed individually and in a highly purified state. For example, hydrocarbon fractions containing a substantial amount of the defined alkylbenzenes, such as petroleum fractions, hydrocarbons obtained from the coking of coal, and the like may be used. These fractions should not contain excessive amounts of reactive hydrocarbons such as olefins and diolefins. Small amounts of non-reactive hydrocarbons such as paraffinic hydrocarbons may be present in the feed without adverse effect on the catalytic conversion process.

The following examples illustrate the best mode now contemplated for carrying out the invention:

EXAMPLE I

About 60 grams of a rare earth zeolite $y$ faujasite (3.5 wt. percent Na; 15.0 wt. percent $Re_2O_3$; 58.5 wt. percent $SiO_2$; 21.1 wt. percent $Al_2O_3$) was contacted at room temperature for 2 hours with a rare earth chloride solution which contained 118 grams of rare earth chloride hexahydrate in 6000 ml. of water. The catalyst was filtered, washed with 2× 100 ml. water, 2× 100 ml. 50/50 acetone/water, 2× 100 ml. of 75/25 acetone/water and 2× 100 ml. acetone. The filtered cake was dried overnight at 95° C. A number of batches were prepared in the same manner and the combined dried catalysts were calcined in a muffle furnace in which the temperature was raised at 150° F./hour to 900° F. and held for two (2) hours at 900° F. The ion exchange, washing and calcination procedures were repeated twice more. After the third exchange and calcination, the catalyst had the following analysis:

|  | Wt. percent |
|---|---|
| Na | 0.1 |
| $Re_2O_3$ | 25.6 |
| Calcium | 0.5 |
| Silica | 54.3 |
| Alumina | 19.0 |

EXAMPLE II

About 62.5 grams of a rare earth-calcium zeolite $x$ faujasite (2.4 wt. percent Na; 0.15 wt. percent Ca; 26.4 wt. percent $Re_2O_3$; 42.0 wt. percent $SiO_2$; 28.0 wt. percent $Al_2O_3$) was contacted for 2 hours at room temperature with 5 liters of solution containing 59 grams of rare earth chloride hexahydrate. The solids were filtered and washed thoroughly with deionized water, dried overnight and calcined at 900° F. for two (2) hours. The exchange step and calcining were repeated twice more. The final product had the following analysis:

|  | Wt. percent |
|---|---|
| Na | 0.05 |
| $Re_2O_3$ | 31.0 |

EXAMPLE III 340 grams of ammonium $y$ faujasite (80.7 wt. percent solids) was oven dried at 230° F., calcined at 1000° F. and then steamed for 90 minutes at 1000° F., using 4400 cc. of steam per minute. The product after steaming weighed 267.3 grams and was base exchanged with 44,500 ml. of ammonium chloride (1 N) overnight at room temperature. The resulting product was washed with 4450 ml. of water and oven dried at 230° F. The product was then refluxed for 90 minutes with ¼ molar solution of diammonium ethylenediamine-tetraacetic acid (4450 ml. of solution adjusted to pH 7.1 with ammonium hydroxide), washed with 4450 ml. of water and oven dried at 230° F. The product analysed 0.16 wt. percent Na; 82.2 wt. percent $SiO_2$; 17.6 wt. percent $Al_2O_3$ and was thereafter calcined at 700° F. for 2 hours.

EXAMPLE IV

A composite mixture of the sodium form of zeolite $y$ faujasite was base exchanged repeatedly with a 2% ammonium chloride solution for a period of time sufficient to reduce the sodium content to 0.24 wt. percent Na. The resulting product after being washed and dried at 230° C. was calcined for 2 hours at 900° F.

EXAMPLE V

The procedure of Example III was repeated except that the final product was calcined for 2 hours at 900° F.

EXAMPLE VI 290 grams of a rare earth zeolite $x$ faujasite was base exchanged for 4 hours at 180° F. with a solution made up from 1000 grams of water and 165 grams of ammonium sulfate (17.8 wt. percent. The product was filtered, washed free of sulfate and dried. The resulting product analysed 0.1 wt. percent Na.

EXAMPLE VII

The hydrogen form of mordenite was prepared by converting the sodium form of synthetic mordenite into the ammonium form by ion exchange followed by calcination to convert the ammonium ion to hydrogen ion. The resulting product analysed 0.04 wt. percent Na and had a silicon to aluminum ratio of 5 to 1.

EXAMPLE VIII

A CDA solution containing 68.8 grams sodium silicate, 4.8 grams sodium aluminate (approximate composition 30.2 percent $Na_2O$, 44.5 percent $Al_2O_3$; remainder ignition loss), 38.6 grams 98 percent sodium hydroxide pellets and 153.0 grams water was prepared. It was formed by dissolving the sodium aluminate into the water and thence adding to that mixture the sodium hydroxide. The solution was maintained at 140–150° F. and into it was introduced the sodium silicate. The resultant solution was permitted to age for 15 minutes. The resultant solution was added to 270.0 grams sodium silicate, 47.5 grams $Al_2(SO_4)_3 \cdot 14H_2O$ was dissolved in 150 grams water together with 25.0 grams 96.5 percent $H_2SO_4$. The resultant aluminum sulfate-sulfuric acid-water solution was mixed into the solution of sodium silicate and CDA. Into that solution was mixed 36.0 grams of 24 percent tetramethylammonium hydroxide in methanol. That resulting solution was held for 16 hours at 212° F. in a loosely capped container to evaporate the methanol. The container was closed and heated at 212° F. until crystals formed. The final product was determined to have a tetramethylammonium oxide: alumina mole ratio of .16:1, a $$Na_2O:Al_2O_3$$

mole ratio of .83:1, a $SiO_2:Al_2O_3$ mole ratio of 5.78. The product crystals were ZSM-4 crystals exhibiting a rod-like habit. The crystals sorbed 3.9 percent by weight cyclohexane measured at 20° C. and 20 mm. Hg and 12.3 percent by weight water determined at 20° C. and 12 mm. Hg. The major portion of the sodium content was base exchanged with aqueous ammonium chloride and the ammonium exchanged form thereafter calcined at 1000° F. for 3 hours to obtain the hydrogen form of ZSM-4. The HZSM-4 composition exhibited the X-ray powder diffraction pattern essentially as shown in Table 1.

EXAMPLE IX

A CDA solution was formed by dissolving 173.70 grams of 97.4 percent sodium hydroxide in 688.80 grams water and adding thereto 21.60 grams of sodium aluminate and 309.60 grams sodium silicate. Into a Waring Blendor of one gallon capacity was introduced a sodium silicate aqueous solution containing 1215.00 grams sodium silicate. The powerstat on the Waring Blendor was turned on at a low speed of about 65 percent capacity and to the sodium silicate solution was added the CDA solution. After the CDA solution was added, an alum solution containing 213.78 grams $Al_2(SO_4)_3 \cdot 14H_2O$, 248.40 grams 96.5 percent $H_2SO_4$ and 1080.00 grams $H_2O$ was added. This caused the mixture in the Waring Blendor to thicken. Mixing continued with the aid of a spatula. When the mixture was mixed thoroughly, 325.80 grams of a 25 percent aqueous solution of tetramethylammonium hydroxide was added until a smooth paste was formed. The product was poured into two 2-quart jars, sealed and placed in a 100° C. steam box. A product crystallized after 34 days. It was a ZSM-4 composition having a silica:alumina mole ratio of 13:1 and the characteristic X-ray diffraction pattern of ZSM-4 as set forth in Table 1 above.

The crystals were base exchanged with 20 wt. percent ammonium sulfate solution, washed free of sulfate, dried at 230° F. and thereafter calcined to convert the ammonium form into the hydrogen form of ZSM-4. The product analyzed 0.34 wt. percent sodium.

EXAMPLE X

A CDA solution was formed by dissolving 169.8 grams of 97.3 percent sodium hydroxide in 673.2 grams water and adding thereto 21.1 grams of sodium aluminate and 302.7 grams sodium silicate. Into a Waring Blendor of one gallon capacity was introduced a 37.3 percent sodium silicate aqueous solution containing 1188.0 grams sodium silicate. The powerstat on the Waring Blendor was turned on at a low speed of about 65 percent capacity and to the sodium silicate solution was added the CDA solution. After the CDA solution was added, an alum solution containing 209.0 grams $Al_2(SO_4)_3 \cdot 14H_2O$, 176.0 grams 96.5 percent $H_2SO_4$ and 960 grams $H_2O$ was added. This caused the mixture in the Waring Blendor to thicken. Mixing continued with the aid of a spatula. When the mixture was mixed thoroughly, 665.5 grams of a 24 percent aqueous solution of tetramethylammonium hydroxide was added until a smooth paste was formed. The contents were placed in a bottle and heated to 100° C. After 30 hours a product crystallized. It was a ZSM-4 composition having a silica:alumina mole ratio of 7.7 to 1 and the characteristic X-ray diffraction pattern of ZSM-4 as set forth in Table 1 above.

The crystals were base exchanged with ammonium chloride, washed free of chloride, dried at 230° F. and thereafter calcined at 1000° F. to convert the ammonium form of ZSM-4 into the hydrogen form. The product analyzed 0.21 wt. percent sodium.

The catalysts of Examples I to X were evaluated for selectivity, i.e., ratio of isomerization to disproportionation, in the isomerization of o-xylene according to the test procedure previously described. As shown below in Table II, crystalline zeolites of the ZSM-4 family are characterized by a selectivity factor in excess of 4 while other crystalline aluminosilicates under the same reaction conditions were unable to achieve a ratio greater than one.

TABLE II

| Catalyst | | Selectivity | Total conversion 10 hrs. | Isomerization | Disproportionation |
|---|---|---|---|---|---|
| Example: | | | | | |
| I | REY | 0 | 3.0 | 0 | 3.0 |
| II | REX | 0.10 | 2.9 | 0.3 | 2.6 |
| III | HY | 0.15 | 1.4 | 0.2 | 1.2 |
| IV | HY | 0.23 | 1.6 | 0.3 | 1.3 |
| V | HY | 0.39 | 25.8 | 7.5 | 18.3 |
| VI | REHX | 0.58 | 39.3 | 14.7 | 24.9 |
| VII | H-mordenite | 0.67 | 2.0 | 0.8 | 1.2 |
| VIII | HZSM-4 | 4.6 | 62.3 | 51.2 | 11.1 |
| IX | HZSM-4 | 8.0 | 28.4 | 25.3 | 3.1 |
| X | HZSM-4 | 14.2 | 30.6 | 28.6 | 2.0 |

EXAMPLE XI

Four solutions were prepared designated below as Solutions A, 1, 2 and 3. In terms of their oxides, the starting composition had the following mole ratios based on alumina.

| | |
|---|---|
| Tetramethylammonium oxide | 0.41 |
| Sodium oxide | 5.74 |
| Alumina | 1.0 |
| Silicate | 16.7 |
| NaCl | 0.82 |
| $Na_2SO_4$ | 4.90 |
| $H_2O$ | 320 |

Solution A was formed by mixing the sodium hydroxide with the sodium silicate. The respective ingredients of the solutions are shown below:

| Solution A: | Lbs. |
|---|---|
| Sodium silicate | 105 |
| NaOH | 13.4 |
| $H_2O$ | 37.1 |
| Solution 1: | |
| $Al_2(SO_4)_3 \cdot 18H_2O$ | 14.95 |
| $H_2SO_4$ (98% by weight) | 7.32 |
| $H_2O$ | 37.1 |
| Solution 2: | |
| Sodium aluminate | 1.42 |
| $H_2O$ | 14.7 |
| Solution 3: | |
| Tetramethylammonium chloride | 2.66 |
| $H_2O$ | 2.66 |

Solution 2 was added to Solution 3 and the resultant Solution (2+3) was added to Solution 1, the resultant Solution (1+2+3) being designated Solution B. Solution A was added into Solution B with rapid stirring, and the combined solutions were mixed for 20 minutes in a Lightening mixer. Solution A was added to Solution B over a period of 13 minutes. The resultant Solution (A+B) was heated at 215–218° F. for 90½ hours, at which time the crystallized product was removed by filtering. During the heating of the solutions the liquid was covered with oil to keep vaporization down to a minimum. The so filtered crystals were washed with hot water. The product composition had the following mole ratios of oxides to alumina:

| | |
|---|---|
| Tetramethylammonium oxide | 0.230 |
| Sodium oxide | 0.808 |
| Alumina | 1.00 |
| $SiO_2$ | 7.04 |

The product was highly crystalline as determined by X-ray analysis. It sorbed 2.2 weight percent cyclohexane at 20° F. under 20 mm. Hg and at up to 12.0 weight percent water at 20° F. under 12 mm. Hg pressure.

It was base exchanged at about 180° F. by 4 contacts with an aqueous ammonium sulfate solution having a concentration between about 15 and 20 percent ammonium sulfate by weight. The exchanges took from between about ½ hour to several hours. The exchanged ZSM-4 composition had a sodium content of about 0.43 weight percent such that the final product had a mole ratio of $Na_2O/Al_2O_3$ of 0.047. The exchanged product was filtered, washed and dried at 230° F. for 16 hours.

A portion of alpha alumina monohydrate was peptized by treating it with 10 weight percent acetic acid. It was blended with the exchanged ZSM-4 catalyst prepared according to the example in a ZSM-4/alpha alumina monohydrate weight ratio of 65/35. The water content of the mixture was adjusted so that the mixture contained about 65 percent by weight solids. At this water level, the combined ZSM-4/alpha alumina monohydrate composition had a dough-like consistency. It was extruded through an extruder and chopped into 1/16″ extrudates. The product was dried for 17 hours at 900° F. while air passed through the catalyst at a rate of 3 volumes air per volume of catalyst per minute.

In order to further illustrate the process of the invention, the ZSM-4 catalyst prepared above was used for the disproportionation of toluene and compared with rare earth exchanged zeolite x and hydrogen exchanged zeolite y. The results are shown in Table III.

TABLE III

| Catalyst | HY [1] | REX [2] | HZSM-4 [3] |
|---|---|---|---|
| Reaction temperature, ° F | 500 | 500 | 550–580 |
| Time on-stream, hours | 1 | 1 | 1–1000 |
| Total conversion, percent wt | 35 | 17 | 48 |
| Products, percent wt. on charge: | | | |
| Cracked products | 1.7 | 3.4 | 0.2 |
| Benzene | 8.4 | 5.0 | 21.8 |
| Toluene | 64.9 | 82.9 | 51.6 |
| p-Xylene | | | |
| m-Xylene | } 19.5 | } 7.3 | } 23.6 |
| o-Xylene | | | |
| $C_9+$ aromatics | 5.5 | 1.4 | 2.7 |

[1] Prepared as in Example III: .16 wt. percent Na.
[2] Prepared as in Example II: .52 wt. percent Na.
[3] Prepared as in Example XI: .34 wt. percent Na; $SiO_2/Al_2O_3$=7/1.

EXAMPLE XII

This preparation was made by first mixing continuously through a mixing nozzle the following solutions over a one hour period:

Solution A: Acid alum solution
   89.3 lbs. $Al_2(SO_4)_3 \cdot 14H_2O$
   25.2 lbs. $H_2SO_4$
   206.5 lbs. water
   Sp. Gr. 1.235 at 75° F.

Solution B: Caustic silicate solution
   142 lbs. 50% NaOH
   242 lbs. water
   28 lbs. tetramethylammonium chloride (50%)
   530.0 lbs. Q brand silicate (8.9 wt. percent $Na_2O$; 28.9 wt. percent $SiO_2$; 62.2 wt. percent $H_2O$)
   Sp. Gr. 1.298 at 73° F.

The mixing volume ratio was 2.8 caustic silicate to 1 volume acid alum. The silicate solution was heated to about 190–200° F. prior to mixing with the acid alum at room temperature.

The resulting mixture at about 190–200° F. was charged to a steam jacked stirred reactor containing 5 gallons of water. In this water was dispersed about one-half lbs. of ZSM-4 seeds. Stirring was continued as the slurry was formed in the reactor. At the completion of the mixing period of one hour, charging all the solutions listed above, the stirrer was removed from the reactor. This reactor was covered to reduce evaporation losses during crystallization. The crystallization reaction was allowed to continue at about 215 to 218° F.

The calculated starting composition of the reaction mixture was as follows:

| | Molar ratio |
|---|---|
| Tetramethylammonium oxide | 0.408 |
| Sodium oxide | 6.05 |
| Alumina | 1.0 |
| Silica | 17.0 |
| NaCl | 0.82 |
| $Na_2SO_4$ | 4.52 |
| $H_2O$ | 3.52 |

Crystallization at 215 to 218° F. was allowed to continue for a total of 76.5 hours at which point the crystallization was terminated. Product ZSM-4 was separated from the supernatant liquid by decanting.

The molar ratio of the product composition, after washing, was as follows:

| | |
|---|---|
| Tetramethylammonium oxide | 0.220 |
| Sodium oxide ($Na_2O$) | 0.868 |
| Alumina ($Al_2O_3$) | 1.00 |
| Silica ($SiO_2$) | 6.6 |

By X-ray analysis, the product analyzed to be 110% crystalline when compared to an established standard ZSM-4.

In the preparation of the instant catalyst a 289 lb. part of the product slurry containing 70 lbs. of the alkali form of ZSM-4 was then processed for alkali removal by first filtering, then water washing, followed by base exchange with a $(NH_4)_2SO_4$ solution approximately 25 wt. percent solution) using 1 lb. of $(NH_4)_2SO_4$ per lb. of NaZSM-4. The processing was carried out on a rotary filter with hot solution (115–180° F.). At the end of filtering and washing, the product was contacted 4 times (1 hour for each contact) with ammonium sulfate (54 lbs. $(NH_4)_2SO_4$ + 158 lbs. $H_2O$) and twice with wash water (about 20.0 gallons of water at 110 to 180° F.). The residual sodium content was 0.45 wt. percent Na. This wet cake was dried at 280° F. in air and then reprocessed twice with $(NH_4)_2SO_4$ using 58 lbs. $(NH_4)_2SO_4$ in 174 lbs. $H_2O$ to 110 to 154° F., following by 2 water wash contacts with about 20 gallons of water at 110 to 180° F.

In the above contacts the product was slurried with the particular solution and heated to temperature. The filtration was started when the slurry was about 110 to 120° F. and continued for about 1 hour. The filter cake was then reslurried into the next contact solution. In this filtration process a filter coagulant (Atlas Chemical Co., G263) was used to aid the filtration.

The wet cake was then dried for about 20 hours at 200° F. in a circulated air dryer.

The final product by analysis was found to contain 0.17 wt. percent $Na_2O$, 4.4 wt. percent nitrogen (dry basis at 230° F.), 20.9 wt. percent $Al_2O_3$ and 80.9 wt. percent $SiO_2$. The silica/alumina ratio was 6.56.

In preparing an extruded catalyst, 10 batches of the following components were first mixed in a muller mixer. In these mixtures, 543.5 grams of the $NH_4ZSM$–4 (82.9 wt. percent solids at 1000° F.) were mixed with 3305 grams $\alpha Al_2O_3 \cdot H_2O$ (72.2 wt. percent solids at 1000° F.). To this was added 23.8 grams acetic acid diluted to 425 cc. with water. These 10 batches were composited together and then extruded hydraulically through 1/25″ dies to form the product. This wet extrudate was dried at 230° F. in an atmosphere of air followed by calcination, in 3 separate batches of about 2000 ml. each, at 900° F. for 10 hours followed by 5 hours at 1000° F. with 3 volumes of air per volume of catalyst. The air was saturated at room temperature with water.

The final calcined extrudate analyzed 0.14 wt. percent Na. The surface of the composite was $328^2$/grams and by X-ray the crystallinity was 50% compared to an established standard.

The ZSM–4 catalyst prepared above was evaluated for the disproportionation of different feed stocks. In one instance 100% ortho xylene was disproportionated to provide valuable tri- and tetramethylbenzenes such as durene (1,2,4,5 - trimethylbenzene). In the other instance a mixture of toluene and trimethylbenzene was disproportionated to provide xylenes. The reaction was carried out in liquid phase at a temperature of 600° F., a pressure of 500 p.s.i.g. and a liquid hourly space velocity (LHSV) of 1/1. The results are shown below in Table IV.

TABLE IV

| Feed | o-Xylene, 100% | Toluene, 80%/ trimethylbenzene, 20% |
|---|---|---|
| Product, wt. percent: | | |
| Lt. ends | .8 | .4 |
| Benzene | 2.5 | 13.8 |
| Toluene | 21.5 | 40.7 |
| Xylenes | 47.8 | 31.8 |
| Ethylbenzene | 0.04 | .5 |
| Tri- and tetramethylbenzenes | 27.9 | 12.3 |
| Ethyltoluene | .2 | .7 |

What is claimed is:

1. A process for effecting catalytic intra- or inter-rearrangement of alkyl aromatic hydrocarbons which comprises contacting an alkyl aromatic hydrocarbon at a temperature within the range of 250° F. and 1000° F. at a pressure of up to about 2000 p.s.i.g. at a liquid hourly space velocity within the range of 0.05 to 40 in the presence of a crystalline zeolite composition having the X-ray powder diffraction pattern as set forth in Table I of the specification and a composition, in terms of mole ratios of oxides, as follows:

$$0.9 \pm 0.2 M_{\frac{2}{n}} O : W_2O_3 : 3\text{-}20 YO_2 : zH_2O$$

wherein M is a cation, $n$ is the valence of said cation, W is selected from the group consisting of aluminum and gallium, Y is selected from the group consisting of silicon and germanium and z is between 0 and 20.

2. The process of claim 1 wherein the zeolite has been subjected to thermal treatment at temperature of 700–1600° F. for a period of 1 minute to 20 hours.

3. The process of claim 1 wherein M is selected from the group consisting of alkylammonium and arylammonium, metals, ammonium and hydrogen.

4. The process of claim 3 wherein the zeolite has been subjected to thermal treatment at a temperature of 700–1600° F. for a period of 1 minute to 20 hours.

5. The process of claim 1 wherein the conversion is carried out at temperature within the range of 350° F. to 650° F.

6. The process of claim 1 wherein the conversion is carried out at a temperature within the range of 500° F. to 800° F.

7. The process of claim 5 wherein the alkyl aromatic hydrocarbon is xylene.

8. The process of claim 6 wherein the alkyl aromatic hydrocarbon is toluene.

9. The process of claim 5 wherein trimethylbenzenes are isomerized.

10. The process of claim 5 wherein tetramethylbenzenes are isomerized.

11. The process of claim 6 wherein dimethylbenzenes are disproportionated to trimethylbenzenes.

12. The process of claim 6 wherein trimethylbenzenes are disproportionated to tetramethylbenzenes.

References Cited

UNITED STATES PATENTS 3,377,400   4/1968   Wise _____ 260—668
3,442,794   5/1969   Van Helden et al. ____ 208—668

DELBERT E. GANTZ, Primary Examiner

G. E. SCHMITKONS, Assistant Examiner

U.S. Cl. X.R.

252—455Z; 260—668A

UNITED STATES PATENT OFFICE
CERTIFICATE OF CORRECTION

Patent No. 3,578,723                    Dated  May 11, 1971

Inventor(s) Emmerson Bowes and John J. Wise

It is certified that error appears in the above-identified patent and that said Letters Patent are hereby corrected as shown below:

Column 2, line 39, "0.0+" should be --0.9+--. Column 3, Line 67, "28" should be --48--. Column 6, line 56, "a" should be --as--. Column 9, line 1, "temperature" should be --temperatures--. Column 10, line 65, "percent." should be --percent).--. Column 14, line 50, "approximately" should be --(approximately--.

Signed and sealed this 31st day of October 1972.

(SEAL)
Attest:

EDWARD M. FLETCHER, JR.                ROBERT GOTTSCHALK
Attesting Officer                       Commissioner of Patents